United States Patent
Aasheim

(10) Patent No.: US 10,984,189 B2
(45) Date of Patent: Apr. 20, 2021

(54) SEARCH ENGINE CONTENT SWITCH

(71) Applicant: Oath Inc., New York, NY (US)

(72) Inventor: Yngve Aasheim, Trondheim (NO)

(73) Assignee: Verizon Media Inc., New York, NY (US)

(*) Notice: Subject to any disclaimer, the term of this patent is extended or adjusted under 35 U.S.C. 154(b) by 951 days.

(21) Appl. No.: 14/984,787

(22) Filed: Dec. 30, 2015

(65) Prior Publication Data

US 2017/0192970 A1 Jul. 6, 2017

(51) Int. Cl.
*G06F 40/197* (2020.01)
*G06F 16/951* (2019.01)
*H04L 29/06* (2006.01)
*H04L 29/08* (2006.01)

(52) U.S. Cl.
CPC .......... *G06F 40/197* (2020.01); *G06F 16/951* (2019.01); *H04L 67/02* (2013.01); *H04L 67/1097* (2013.01); *H04L 67/26* (2013.01); *H04L 67/42* (2013.01)

(58) Field of Classification Search
CPC .......... G06F 17/2288; G06F 17/30864; G06F 16/951; G06F 40/197; H04L 67/42; H04L 67/02; H04L 67/26; H04L 67/1097
See application file for complete search history.

(56) References Cited

U.S. PATENT DOCUMENTS

| | | | |
|---|---|---|---|
| 9,098,554 B2* | 8/2015 | Issa | H04L 67/104 |
| 2008/0294674 A1* | 11/2008 | Reztlaff, II | G06Q 30/00 |
| 2009/0198670 A1* | 8/2009 | Shiffer | G06F 17/30675 |
| 2010/0265935 A1* | 10/2010 | Okada | H04W 84/18 |
| | | | 370/350 |
| 2013/0061156 A1* | 3/2013 | Olsen | G06Q 50/01 |
| | | | 715/753 |
| 2016/0203175 A1* | 7/2016 | Kachmar | G06F 17/30584 |
| | | | 707/609 |

OTHER PUBLICATIONS

Wikipedia, "Inverted Index," https://en.wikipedia.org/wiki/Inverted_index, 3 Pages, Dec. 8, 2015.
Daniel Lemire's Blog, "Bitmaps are Surprisingly Efficient," http://lemire.me/blog/2012/02/17/bitmaps-are-surprisingly-efficient/, 8 Pages, Feb. 17, 2012.
Elastic, "Lucene's Handling of Deleted Documents," https://www.elastic.co/blog/lucenes-handling-of-deleted-documents, 8 Pages, Jan. 30, 2015.
Google Developers, "Filtering and Sorting Search Results,": https://developers.google.com/custom-search/docs/structured_search?hl=en, 15 pages, May 24, 2015.

* cited by examiner

*Primary Examiner* — Mark D Featherstone
*Assistant Examiner* — Faezeh Forouharnejad
(74) *Attorney, Agent, or Firm* — Cooper Legal Group, LLC

(57) ABSTRACT

Briefly, embodiments disclosed herein relate to switching between versions of digital content to be displayed, such as to a user, in a real-time searching environment, for example.

18 Claims, 4 Drawing Sheets

SEARCH ENGINE CONTENT SWITCH

BACKGROUND

Field

Subject matter disclosed herein relates to switching between versions of content to be displayed, such as to a user.

Information

With networks, such as the Internet, gaining popularity, and with a vast multitude of content, such as pages, other electronic documents, other media content and/or applications (hereinafter 'digital content'), becoming available to users, such as via the World Wide Web (hereinafter 'Web'), it may be desirable to provide more efficient and/or more streamlined approaches to gather, organize, store, modify, search, and/or retrieve digital content, for example. Internet-type business entities, such as Yahoo!, for example, may provide a wide range of digital content storage, search, and/or retrieval services for a wide range of applications. Such digital content storage, search, and/or retrieval services may involve distributed systems, particularly for large amounts of digital content to be accessed, stored, modified, and/or searched, for example, by large numbers of clients (e.g., client computing devices).

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
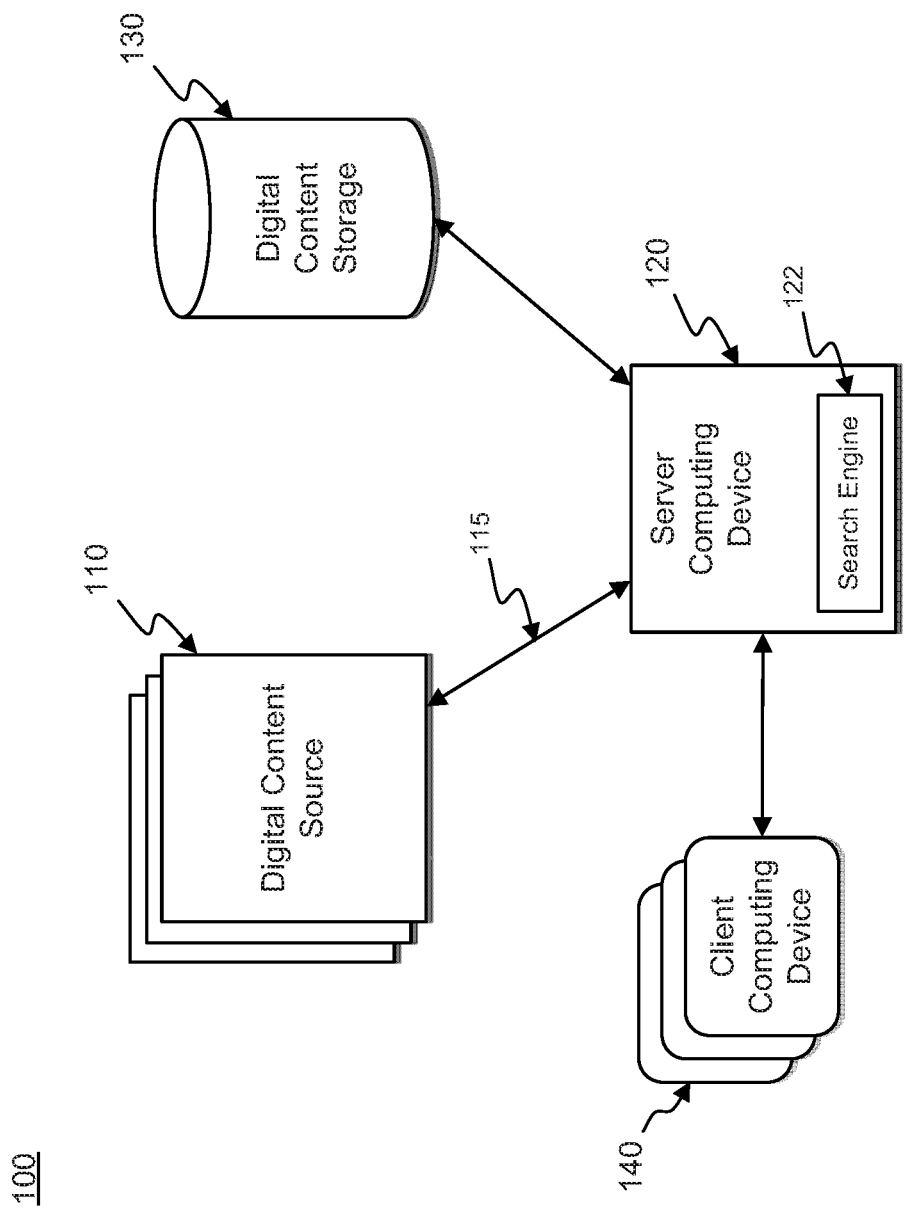
FIG. 1 is a schematic diagram illustrating an example real-time search engine environment, in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and/or embodiments and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing and/or communication approaches in which portions of a problem, such as signal processing of signal samples, for example, may be allocated among various devices, including one or more clients and/or one or more servers, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual devices. A map operation and/or similar terms refer to processing of signals (e.g., signal samples) to generate one or more key-value pairs and to distribute the one or more pairs to devices of a system (e.g., network). A reduce operation and/or similar terms refer to processing of signals (e.g., signal samples) via a summary operation (e.g., such as counting the number of students in a queue, yielding name frequencies). A system may employ such an architecture for processing by marshaling distributed servers, running various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture over a distributed system. Furthermore, here, use of the term "Hadoop" is intended to include presently known, existing versions of Hadoop and/or or later developed versions of Hadoop.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, a client and/or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server device and a client device and/or other types of network and/or computing devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics.

Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or network communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent to the devices. In this context, the term transparent, if used with respect to devices of a network, refers to the device communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes and/or thus, may include the devices communicating via the one or more intermediate nodes and/or the one or more intermediate devices of the one or more intermediate nodes as if such intermediate nodes and/or intermediate devices are not necessarily involved in such network communication. For example, a router may provide a link and/or connection between otherwise separate and/or independent LANs. In this context, a private network refers to a particular, limited set of devices, such as network devices and/or computing devices, able to communicate with other devices, such as network devices and/or computing devices, in the particular, limited set, such as via signal packet and/or frame communications, for example, without a need for re-routing and/or redirecting communication. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame communications may employ intermediate devices of intermediate nodes to exchange signal packets and/or signal frames, those intermediate devices may not necessarily be included in the private network by not being a source or destination for one or more signal packet and/or signal frames, for example. It is understood in this context that a private network may provide outgoing network communications to devices not in the private network, but devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise a service that organizes stored digital content, such as, for example, text, images, video, etc., through the use of hypermedia, for example. It is noted that a network, such as the Internet and/or Web, may be employed to store files and/or electronic documents. The term file and the term electronic document are used throughout this document in a generic sense to refer to a set of stored memory states and/or a set of physical signals associated in a manner so as to form a file and/or an electronic document. That is, it is not meant to implicitly reference a particular syntax, format and/or approach used with respect to a set of associated memory states and/or a set of associated physical signals. If a particular type of file storage format and/or syntax, for example, is intended, it is referenced expressly herein.

A HyperText Markup Language ("HTML"), for example, may be utilized to specify digital content and/or to specify a format for hypermedia type digital content, such as in the form of a file and/or an electronic document such as a Web page, website, etc., for example. An Extensible Markup Language ("XML") may also be utilized to specify digital content and/or format of hypermedia type digital content, such as in the form of a file or an electronic document, such as a Web page, website, etc., in an embodiment. Of course, HTML and/or XML are merely examples of "markup" languages, provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript, for example, executable by a computing device to provide digital content to populate an electronic document in an appropriate format, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be readily perceivable by humans (e.g., in a digital format). Likewise, in this context, digital content provided to a user in a form so that the user is able to readily perceive the underlying content itself (e.g., hear audio and/or see images, as examples) is referred to, with respect to the user, as 'consuming' digital content, 'consumption' of digital content, 'consumable' digital content and/or similar terms. For one or more embodiments, an electronic document may comprise a Web page of code (e.g., computer instructions) in a markup language, such as, for example, HTML (hypertext markup language), as previously described, executed or to be executed by a computing and/or networking device, for example. In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, digital content may comprise, for example, text, images, audio, video, and/or other types of electronic documents and/or portions thereof, for example.

Also as used herein, one or more parameters refer to material descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to digital content, such as digital content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), coding formats (e.g., type of computer instructions, such as a markup language) and/or other related standards and/or specifications used in order for an electronic document to be substantially compliant and/or substantially compatible, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. It is also noted that in the context of this patent application, the term transmission is intended as a generic term for a type of network signal communication (e.g., signal packets and/or signal frames), such as a communication made or to be made across a network or across a portion thereof. However, it is not intended to imply a particular directionality of communication and/or a particular initiating end of a communication path for the 'transmission' communication. For example, the mere use of the term in and of itself is not intended herein to provide particular implications with respect to the one or more signals being communicated, such as, for example, whether the signals are being communicated "to" a particular device, whether the signals are being "from" a particular device, and/or regarding which end of a communication path may be initiating communication, such as in a "push type" of signal transfer or in a "pull type" of signal transfer. Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In particular implementations, a network communications protocol for communicating between devices may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network communications (e.g., signal packets and/or frames), for example, to occur between a remote device and a VPN server on a local network. A remote device may be authenticated and a VPN server, for example, may create a special route between a local network and the remote device through an intervening router. However, a route may be generated and/or also regenerated if the remote device is power cycled, for example. Also, a VPN is typically understood in this context to affect a single remote device.

A network may be very large, such as comprising thousands of nodes, millions of nodes, billions of nodes, or more, as examples. As mentioned, with networks, such as the Internet, gaining popularity, and with a vast multitude of digital content, such as pages, other electronic documents, other digital media content, and/or applications, becoming available to users, such as via the World Wide Web (hereinafter 'Web'), it may be desirable to provide more efficient and/or more streamlined approaches to gather, organize, store, modify, search, and/or retrieve content, such as digital content, for example. Internet-type business entities, such as Yahoo!, for example, may provide a wide range of digital content storage, search, and/or retrieval services for a wide range of applications, for example. Such digital content storage, search, and/or retrieval services may involve distributed systems, particularly for large amounts of digital content to be accessed, stored, modified, and/or searched, for example, by large numbers of clients (e.g., client computing devices).

FIG. 1 is a schematic diagram illustrating an example real-time search engine environment, in accordance with an embodiment. Example embodiment 100 may comprise one or more computing devices, such as digital content source computing devices 110 and server computing device 120, which may comprise digital content stored in a database, such as digital content storage 130, as described in more detail below; however, this is merely an example for purposes of illustration.

In an embodiment, a database, such as digital content storage 130, may comprise digital content stored as signals and/or states in a memory of one or more computing devices. A database program for digital content storage 130 may comprise a version of the HBase Database program, available from the Apache Software Foundation, Forrest Hill, Md., which may include any currently available version and/or a version available in the future; however, any database program is suitable. For example, other embodiments may employ versions of the Oracle Database program (also referred to as Oracle RDBMS), for example, available from the Oracle Corporation, Redwood City, Calif. or may employ versions of the Access Database program (also referred to as Access DBMS), for example, available from Microsoft Corporation, Redmond, Wash. Of course, Hbase, Oracle, and/or Access which, again, may include any currently available version and/or a version available in the future, are provided merely as example database types, and claimed subject matter is not limited in scope in this respect. It is noted that in a typical embodiment, a database index may be located at device 120, although this is not a requirement. A database index may be located elsewhere as long as it is accessible by device 120, for example.

In an embodiment, a computing device, such as server computing device 120, may manage access to a database, such as digital content storage 130, for example. However, digital content sources for content stored in a database, such as digital content storage 130, may include computing devices, such as 110, which may communicate content via a network to another computing device, such as 120. Server computing device 120 may process communicated digital content so that it resides in 130 in an organized fashion, through a database program, for example, such as those described above as non-limiting examples, which may provide a variety of benefits.

A computing device, such as server computing device 120, may further comprise a search engine, such as search engine 122, which may perform query operations on digital content stored in a database, such as digital content storage 130. Of course, many computing devices may be employed in connection with a search engine and this example is simplified for illustrative purposes. Also, in an embodiment, a search engine, such as search engine 122, may index digital content communicated from other (e.g., external) sources, such as digital content source computing devices 110, while storing it in 130, for example, to support query operations. It is noted that an index may be located at device 120, such as part of search engine 122, although, again, this is not a requirement. An index of content may likewise be located elsewhere accessible by device 120, for example. Digital content may be pushed to server computing device 120 (e.g., by digital content source computing devices 110) and/or server computing device 120 may pull digital content from a source (e.g., digital content source computing devices 110), such as digital content labeled with one or more identifiers, as discussed more fully below.

In an embodiment, a query may be submitted by a computing device, such as client computing device 140 (although, likewise, in an embodiment a query may be pulled). A query may specify one or more criteria that a search engine may use to identify and/or retrieve a subset of digital content stored in one or more databases, such as digital content storage 130, for example. Thus, a user, such as via client computing device 140, for example, may search a large amount of electronic documents that may be stored in one or more databases, such as digital content storage 130, to identify a subject (e.g., subject matter within electronic documents to be searched) that may be of interest to the user, for example. A user may specify one or more criteria for a desired subset of electronic documents at least in part by specifying one or more search terms that may be utilized by a search engine, such as search engine 122, to query a database, such as digital content storage 130, although other searching approaches may likewise be employed and covered by claimed subject matter.

In an embodiment, a search engine, such as search engine 122, may comprise a "real-time" search engine. As used herein, the term "real-time search engine" and/or the like refers to a search engine that indexes new and/or updated digital content, such as communicated via digital content sources, such as digital content source computing devices 110, in substantially real-time. That is, in an embodiment, new and/or updated digital content may be indexed approximately as it is pulled from a digital content source and/or pushed from a digital content source, and the new and/or updated digital content may be approximately immediately available for searching. As used herein, the term "real-time" as it relates to an action to be taken refers to taking the action significant added delay. For example, indexing new and/or updated digital content in "real-time" refers to indexing the new and/or updated digital content without significant added delay, such as on the order of hundreds of milliseconds or less, as an example. However, the real time search environment itself may operate on the order of hundreds of microseconds or less, but, communications between nodes of a network may typically result in some delay in indexing to complete various processing tasks.

In an embodiment, a real-time search engine, such as search engine 122, may process updates to digital content such as may be available via a digital content source, such as one or more digital content source computing devices 110. For example, updated digital content may be processed, at least in part, via a search engine, such as search engine 122, indexing new and/or modified digital content communicated, such as via push or pull type communications, for example, between computing devices, such as digital content source computing device 110 and server computing device 120. Also, in an embodiment, updates to digital content, such as for a web page, website, and/or other electronic documents, for example, may be made visible, such as to an end user, in search results approximately immediately after the updates are indexed, which in an embodiment may occur upon or relatively soon after digital content has been communicated, such as via push or pull type communications, for example.

In some circumstances, however, ready visibility may pose issues, such as for some users and/or other entities. As an example, consider that at Yahoo! Autos, an individual may research makes and/or models of automobiles, may access articles and/or other documents (e.g., electronic documents) related to automobiles, and/or may search for automobiles for sale. A Yahoo! Autos landing page in this example may link to a number of other pages, some of which, for example, may be populated with digital content, as an example. Also, digital content may be communicated with respect to a number of digital content sources. Due at least in part to the real-time nature of updates to digital content that may populate pages at a web page, website and/or an online application, such as at Yahoo! Autos, for example, situations may arise wherein partial (e.g., incomplete) updates to one or more Web pages, such as due at least partially to some digital content being updated and other digital content not being updated, for example, may affect user experience, such as with one or more broken links, to name an illustrative undesirable consequence. For example, some Internet and/or Web applications may fail to execute as anticipated and/or expected due at least in part to, for search engine results, digital content not being updated in an orderly fashion in some situations. Likewise, in another situation, a feed of a relatively large number of items, (e.g., electronic documents) such as on the order of millions, for example, is to be updated, but it may be desirable to have it appear that these items were updated at one time. Of course, these are merely examples of how updates to digital content, such as for web pages, websites and/or other electronic documents, for example, may in some situations affect user experience in a search engine environment.

In contrast, an orderly update involving a search engine, such as search engine 122, may filter queries such that query results from a first version of digital content may be visible, such as to a user, while query results from a version of the digital content, partially but not completely updated, may not necessarily be visible. Updates to digital content may be indexed and/or may otherwise accumulate without being visible. A switch of visible digital content may, after updates are complete, be made. In an embodiment, a switch may be performed atomically. In this context, the term "atomically" and/or the like, if used to refer to a search engine environment, such as for a computing and/or communications network, refers to a switch from one version of digital content, such as a digital content feed, as an example, to another version of a digital content, such as an updated digital content feed, as an example, made after updates are complete. In this manner, situations including partial updates may be hidden from users in general to potentially reduce confusion, for example.

As used herein, the term "update" and/or the like employed in this context with reference to particular digital content in a search engine environment, again, such as for a computing and/or communications network, refers to communicating in a network or system, such as a distributed system, in which new and/or modified digital content associated with previously communicated particular digital content is being stored and indexed with the previously communicated particular digital content. One such example includes computing device 110 and computing device 120, previously described. Likewise, communication may comprise a push-type communication or a pull-type communication. Thus, in an embodiment, a set of digital content, such as may be stored in one or more databases and/or like repositories (e.g., 130), for example, may be updated at least in part by communicating new and/or modified digital content between computing devices, such as digital content source computing device 110 and server computing device 120, for example, and at least in part by indexing the one or more new and/or modified digital content in the one or more databases and/or like repositories, such as digital content storage 130, as an example. Further, as used herein, the term "complete" and/or the like employed in this context with reference to particular digital content in a search engine environment and employed in this context with reference to updating particular digital content, refers to the particular digital content with substantially no additional updates pending for the particular digital content. Thus, for example, for particular digital content, the particular digital content has been updated and the update has been indexed with no further updates pending for the particular digital content.

In an embodiment, updates to digital content may be specified and/or generated, for example, via a digital content source, such as digital content source computing device 110. Additionally, in an embodiment, a computing device, such as digital content source computing device 110, for example, may indicate, such as via network communications (which may include one or more signal packets and/or frames) that no further updates are pending for specified digital content. In another embodiment, updates may be visible to an indexing process, so that it may be apparent if no further updates are pending. A search engine, thus, may complete indexing of particular digital content at least in part by indexing any updates of the particular digital content until no further updates are pending for the particular digital content. Also, in an embodiment, a digital content source, such as digital content source computing device 110, as part of an update, may delete digital content in connection with an update, for example.

In an embodiment, digital content available via digital content sources, such as digital content source computing devices 110, may comprise one or more "feeds." As utilized herein, the term "feed" (e.g., digital content feed) and/or the like refers to an identifiable set of digital content, including one or more updates to digital content, to be communicated via a network, without human involvement and/or interaction. Again, one example may comprise computing devices of a network, such as digital content source computing device 110 and server computing device 120, and communication may comprise push or pull type communications. In an embodiment, signals and/or states comprising one or more feeds after being communicated between computing devices, such as between digital content source computing device 110 and server computing device 120, may be stored and indexed in a database, such as digital content storage 130. Also, in an embodiment, digital content of a feed may be updated at least in part by communicating, without human involvement and/or interaction, new and/or modified digital content associated with previously communicated particular digital content of a feed, such as a feed between digital content source computing device 110 and server computing device 120. Thus, the one or more new and/or modified digital content may be stored and indexed in one or more databases, such as digital content storage 130, for example.

Further, in an embodiment, multiple updates to a feed may occur over a period of time in which the new and/or modified digital content is associated with previously communicated particular digital content. Likewise, it is possible to update several different and independent feeds concurrently, in an embodiment. A computing device, such as digital content source computing device 110, for example, in an embodiment, may specify, such as via one or more signal packets, that no further updates are pending for a specified version of one or more feeds being updated. For example, a computing device, such as digital content source computing device 110, may generate one or more updates associated with a particular version of a feed, and/or may indicate that no further updates are pending for the particular version of the feed, in an embodiment. However, as previously discussed, in some implementations, updates may be visible to an indexing process to that it may be apparent if no additional updates are pending.

As discussed in more detail below, particular feeds and/or particular versions thereof are capable of being identified in an embodiment. Thus, subsequently, a computing device, such as digital content source computing device 110, may generate one or more additional updates to be associated with a further version of a feed, as an example. In this manner, for example, multiple versions of a feed may be generated over a period of time, in an embodiment. Also, in an embodiment, updates to feeds and/or generation of different versions of feeds may occur substantially periodically, occasionally, and/or intermittently, and/or any combination thereof, although claimed subject matter is not limited in scope in these respects.

In an embodiment, a computing device, such as server computing device 120, may "subscribe" to one or more feeds, such as one or more feeds available via one or more digital content sources, such as digital content source computing devices 110. As discussed in more detail below, particular feeds and/or particular versions thereof are capable of being identified in an embodiment. Thus, as utilized herein, the term "subscribe" as it relates to one or more feeds in this context refers to communication to a particular target location on a network, such as website, a server, a URL, an email address, a network address, etc., without human involvement and/or interaction. For example, a computing device, such as server computing device 120, may subscribe to one or more particular feeds available via one or more digital content sources, such as digital content source computing devices 110. Thus, new and/or updates of digital content for one or more "subscribed" feeds may be provided, such as between one or more digital content sources, such as one or more digital content source computing devices 110, and one or more computing devices, such as server computing device 120. In an embodiment, a digital content source, such as digital content source computing device 110, may push new and/or updated digital content corresponding to a subscribed feed to a computing device, such as server computing device 120, and/or a computing device, such as server computing device 120, may pull new and/or updated digital content corresponding to a subscribed feed via a digital content source, such as digital content source computing device 110. Also, in an embodiment, a digital content source, such as digital content source computing device 110, as part of an update, for example, may delete content of a subscribed feed, as previously alluded to.

In an embodiment, digital content, such as for a web page, website and/or other electronic documents, may comprise a body of digital content and/or may comprise one or more parameters related thereto, as previously described. Parameter values may be utilized to filter search results, in an embodiment. For example, a query may specify one or more parameter values for digital content stored at a database, such as digital content storage 130. A search engine, such as search engine 122, may return results that may correspond to parameter values specified by a query. That is, parameter values associated with digital content may be utilized by a search engine, such as search engine 122, to filter search results, in an embodiment.

In an embodiment, digital content of a particular feed may be assigned a parameter, such as a feed identifier, to specify a particular feed, and/or may further be assigned one or more additional parameters to specify particular digital content components, for example. Additionally, in an embodiment, digital content, such as a feed of digital content, may further be assigned one or more parameters, such as a version identifier, to specify a particular version. In this manner, a database, such as digital content storage 130, for example, may store multiple versions of digital content. For example, updated and/or partially updated digital content may be assigned a parameter, such as a version identifier "new," and non-updated digital content may have a parameter, such as a version identifier "old," in an embodiment. Of course, these are merely example parameters and/or identifiers for one or more example embodiments, and claimed subject matter is not limited in scope to the particular examples described herein.

To handle partial updates in a more orderly fashion, in an embodiment, a search engine, such as search engine 122, may filter search results such that updated and/or partially updated versions, such as may be identified as "new" versions, may not be visible to an end user, for example, while "old" versions may be visible to an end user, for example, in an embodiment. Additionally, in an embodiment, new and/or updated digital content may continue to be communicated, such as to a server, such as 120, and may be stored and indexed, while queries of a database continue to return results using "old" versions of digital content.

Further, in an embodiment, at least in part in response to updates to digital content of a feed being complete, a switch, such as one made atomically, between an "old" version of digital content and a "new" version may be made, such that search results may return "new" versions of digital content. As mentioned, the term "complete" and/or the like employed in the context of updates to particular digital content refers to particular updated digital content being indexed and stored in one or more databases, such as digital content storage 130, for example, with substantially no additional updates pending for the particular digital content. With respect to updates to a particular feed and/or version of a feed, the term "complete" refers to updated digital content for a particular feed and/or version of a feed being indexed and stored in one or more databases, such as digital content storage 130, for example, with substantially no additional updates pending for the particular feed and/or version of a feed. In an embodiment, one or more communications, such as one or more signal packets and/or frames, between computing devices, such as digital content source computing device 110 and server computing device 120, may indicate that no further updates to a specified feed and/or version of a feed are pending.

In an embodiment, a switch may be made atomically, as mentioned, which is to say that a switch may occur between content versions after substantially all presently specified updates have been made. Thus, versions of digital content for query operations for a real-time search engine may be switched atomically, in an embodiment. Thus, an a switch atomically made from one version to another version may happen for a particular digital content feed at a particular time, in an embodiment. In this manner, a more orderly update of digital content for a particular feed, for example, may take place, in an embodiment. Further, in an embodiment, multiple feeds may be stored and indexed and/or managed substantially concurrently in a similar fashion in order to be switched atomically, as appropriate.

It is likewise noted that feeds of digital content are discussed as an illustration of a content switch; however, claimed subject matter is not intended to be limited to content feeds. Rather, the approach described may be employed to atomically (and likewise to consistently) hide or show any predefined part of digital content displayed, such as via a web page and/or a website, for example, at a desired time, and/or for a certain set of users. Likewise, a similar approach might be used at a higher granularity to maintain a consistent view of an indexed corpus residing on a cluster of search engine-related servers (e.g., nodes) using several redundant copies of subsets of visible digital content by instituting a mechanism in which selected nodes remain visible after other nodes are offline, such as due to serving issues, for example. Likewise, individual nodes may be brought back online to gradually begin again to serve content in a similar manner. Thus, the foregoing are additional illustrations of atomically switching between identified digital content, as previously described, other than for a feed.

Figure 2:
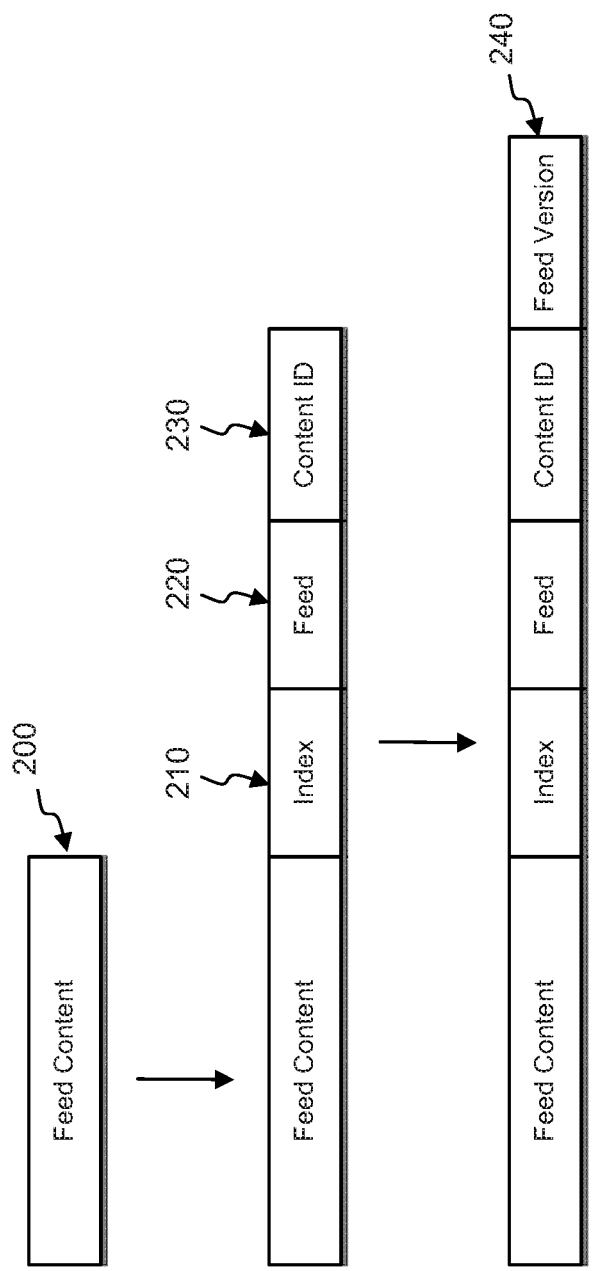
FIG. 2. Is a schematic diagram depicting example feed content indexed and labeled with a feed version parameter, in accordance with an embodiment.

FIG. 2 is a schematic diagram depicting example feed content, such as feed content 200, in an embodiment. Feed content, such as feed content 200, may comprise digital content, such as for a web page, a website and/or other electronic document, for example. Thus, feed content 200, for example, may be indexed by a search engine, such as search engine 122, which may be executed on a server computing device, such as server computing device 120, as an example. Of course, a search engine performing indexing may comprise a distributed system involving many computing devices in an embodiment. This example is simplified for purposes of discussion and illustration.

To index feed content, such as feed content 200, a search engine, such as search engine 122, may append one or more parameters as identifiers, in an embodiment, such as, upon or following communication of the digital content. For example, an "index" parameter, such as 210, may comprise a parameter identifier for an index which, in this context, refers to a particular collection and/or set of feeds and other associated digital content in a large body of digital content. A "feed" parameter, such as 220, may comprise a parameter identifier for a particular feed to which feed content, such as feed content 200, may belong, such as out of the particular collection and/or set of feeds and other associated digital content. Additionally, a content identifier parameter, such as 230, may comprise a digital content identifier parameter, such as to identify particular digital content, such as out of the digital content of a particular feed, for example. Of course, claimed subject matter is not limited in scope in these respects. Rather, a host and/or variety of identifiers may be employed and claimed subject matter is not intended to be limited to an illustration.

Further, in an embodiment, a feed version parameter, such as 240, may be appended to feed content 200, and/or may comprise a parameter value to specify a particular version of feed content, such as feed content 200, for atomic switching, for example. Thus, a first parameter value of a feed version, such as feed version 240, may indicate a current version of feed content, such as of feed content 200. A second parameter value of a feed version, such as feed version 240, may indicate an updated version of feed content, such as of feed content 200. Likewise, a search engine, such as search engine 122, may filter query results such that feed content labeled with a first parameter value for feed version parameter 240 may be visible, such as to a user, and such that feed content labeled with a second parameter value for feed version parameter 240 may not be visible.

Additionally, in an embodiment, after a determination that particular digital content has completed being updated, an atomic switching of versions may be performed. For example, as an illustration, if a particular feed has completed being updated, a switching of feed versions may be performed atomically. Thus, a search engine, such as search engine 122, may filter query results such that feed content labeled with a first parameter value for feed version parameter 240 may no longer be visible and such that feed content labeled with a second parameter value for feed version parameter 240 may be visible, in an embodiment. A search engine, such as search engine 122, may further remove feed content labeled with a first parameter value for feed version parameter 240 from a search index after atomic switching of feed versions, in an embodiment, for example.

Figure 3:
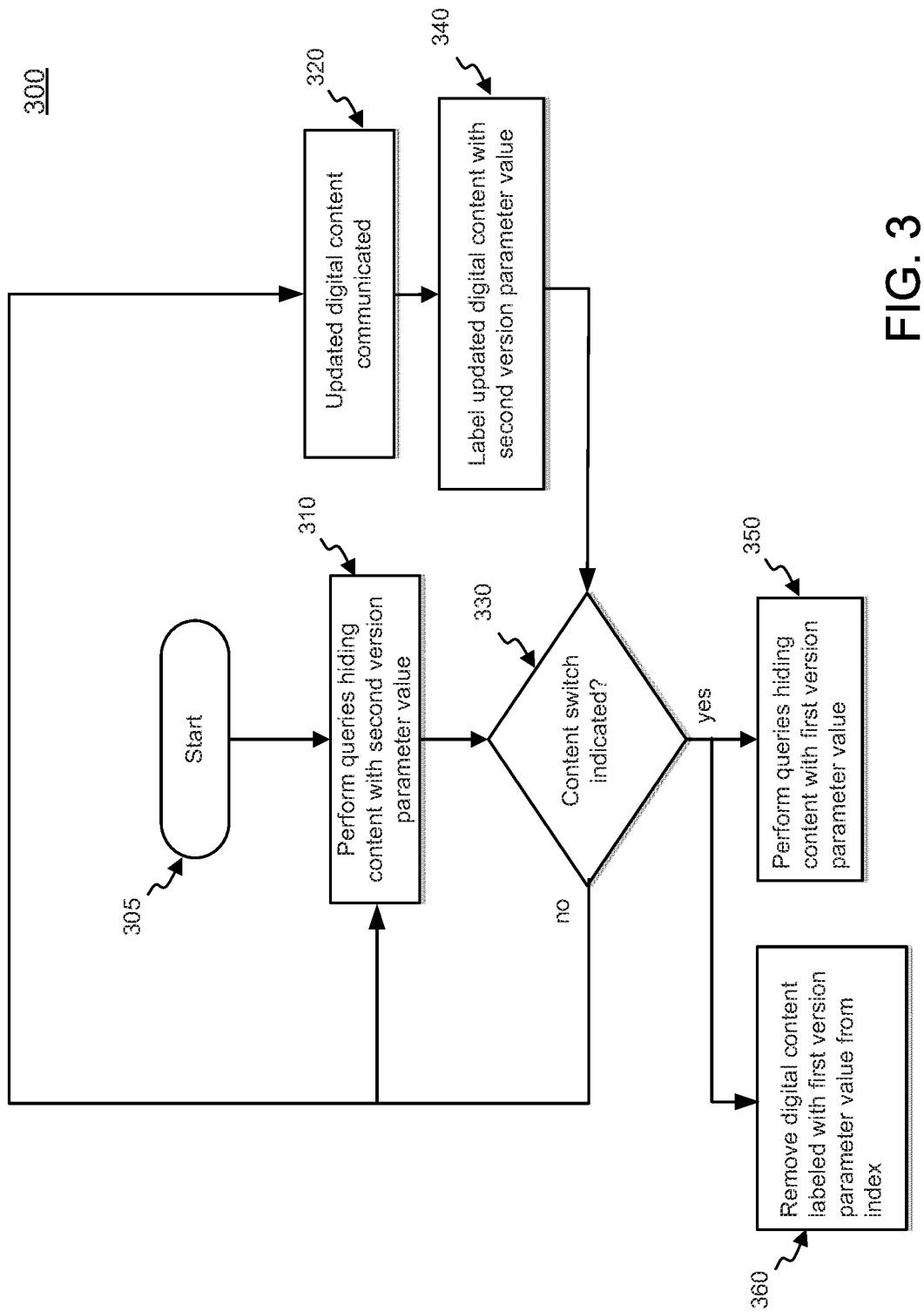
FIG. 3 is a flow diagram illustrating an example process for atomically switching content, such as between a first version of a feed and an updated version of a feed, in a real-time search-engine environment, in accordance with an embodiment.

FIG. 3 is a flow diagram illustrating an embodiment 300 of an example process for atomically switching between digital content versions, such as content feed, for example. Again, as an illustration, an atomic switch may take place between a first version of a feed and an updated version of a feed, such as in a real-time search-engine environment. Claimed subject matter may include all of blocks 310-360, fewer than blocks 310-360, or more than blocks 310-360. Additionally, the order of blocks 310-360 is merely an example order, and claimed subject matter is not limited in scope in these respects.

For example embodiment 300, an example process may begin, for example, initially at block 305. One or more queries may be performed using a version parameter value indicating a first version of digital content. As used herein, an "old" and/or "first" version parameter value may indicate a non-updated and/or a previously-updated version for digital content, although claimed subject matter is not limited in scope in this respect. Likewise, in an embodiment, however, as shown by block 310, a new or updated version may be hidden so that one or more queries may be performed so that a version parameter may be employed implicitly rather than explicit in an embodiment. Thus, block 310 indicates that a second feed version, in this example, is hidden. In an embodiment, as mentioned previously, digital content may be updated atomically, in that any updates to be performed may be accomplished before a search engine is to begin including the updated digital content in search results, in an embodiment. For example process embodiment 300, digital content labeled, such as via an indexing operation, for example, with a first version parameter value may be included in search results, in an embodiment, since those are not hidden, in this example.

As also indicated at block 320, updates of digital content may be communicated, such as for a particular feed, as an example. For example, updates of digital content may be communicated between a digital content source, such as digital content source computing device 110, and a computing device, such as server computing device 120. In an embodiment, updates of digital content, such as may be communicated between digital content source computing device 110 and server computing device 120, for example, may be indexed at a computing device, such as server computing device 120. Thus, as described, in an embodiment, updates of digital content may be labeled with a second version parameter value, such as part of an indexing operation, as depicted at block 340, in an embodiment. For example, in an embodiment, as a result of being hidden, for example, updates of digital content that may be initially excluded (e.g., for a period of time) from search results by a search engine, such as search engine 122. In an embodiment, digital content labeled with a second feed version parameter value may continue to be hidden and excluded from search results, such as until or after a switch of content, as described below.

In an embodiment, updates of digital content may be communicated for storage and indexing, such as described at blocks 320 and/or 340, for example, substantially concurrently with query operations. For example, a search engine, such as search engine 122, may perform query operations on digital content, in which the particular digital content version may be specified, at least in part, by a first version parameter value, as was described. As a search engine performs query operations on a first version, for example, updates to a second version may be processed in a substantially concurrent fashion. For example, multiple versions of digital content may be stored in a database, such as digital content storage 130, as may be specified at least in part by version parameter values, in an embodiment. Thus, query operations, such as may be performed by search engine 122, for example, may be performed, while updates to a second version of digital content, although hidden, may be processed in a substantially concurrent fashion, in some embodiments at least.

As depicted at block 330, at some point, a determination may be made as to whether a content switch is indicated. A content switch may be performed, if updates to particular digital content are complete, for example. To perform a content switch, a search engine, such as search engine 122, may include digital content labeled with a second feed version parameter value may no longer be hidden and may therefore be included in search results, as depicted at block 350, while digital content labeled with a first version parameter value may be hidden, in an embodiment. Thus, in an embodiment, for block 350, version parameters may be used implicitly, as previously indicated. That is, in this example, a first or initial version may become hidden appropriately after storage and indexing of an update, such as for a search engine performing queries, rather than employing a version parameter explicitly. Additionally, as depicted at block 360, a search engine, such as search engine 122, may remove digital content labeled with a first version parameter value from a search index, in an embodiment. One benefit of an implicit approach for a feed version parameter is that typically one or a small number of feeds typically are updated at a given time, thus reducing the number of parameters to be processed.

In an embodiment, an example search engine, such as search engine 122, may provide create, read, update, and/or delete (CRUD) functionality (e.g., operations) for digital content to be stored in a database, such as digital content storage 130, for example. In an embodiment, "create" functionality may be implemented using PUT and/or POST operations, "read" functionality may be implemented using a GET operation, "update" functionality may be implemented using PUT and/or PATCH operations, and/or "delete" functionality may be implemented using a DELETE operation, for example. In an embodiment, PUT, POST, GET, PATCH, and/or DELETE operations may be substantially compliant and/or substantially compatible with Hypertext Transfer Protocol (HTTP) 1.1, specified in RFC 2616 released January 1997 by the Internet Engineering Taskforce (IETF), although, of course, claimed subject matter is not limited in scope to this illustrative example. Also, in an embodiment, an example search engine, such as search engine 122, may be implemented in JavaScript and may also be accessed via a REST API. "JavaScript" refers to an implementation of ECMAScript, such as specified in the ECMAScript 2015 Language Specification, 6$^{th}$ edition, June 2015. Also, as used herein, the term "REST API" refers to Representational State Transfer (REST) Application Programming Interface (API). "REST" refers to a software architectural style (e.g., not a standard or specification) implemented in some systems of the World Wide Web, as first proposed by Roy Thomas Fielding in his 2000 PhD dissertation "Architectural Styles and the Design of Network-based Software Architectures" [see http://www.ics.uci.edu/~fielding/pubs/dissertation/rest_arch_style.htm].

REST implementations may make use of HTTP, URI, JSON, and/or XML, for example. As mentioned above, "XML" refers to Extensible Markup Language. An XML 1.0 Specification is published by the World Wide Web Consortium (W3C). "URI" refers to Uniform Resource Indicator, specified in RFC 3986 released in January 2005 by the IETF, and "JSON" refers to Javascript Notation, specified in RFC 7159 released in March, 2014 by the IETF. Of course, these are merely example operations, architectures, standards and/or specifications that may be utilized in embodiments described herein, and claimed subject matter is not limited in scope to these specific examples. Also, although specific versions of example operations, standards, specifications, and/or architectures are mentioned, embodiments in accordance with claimed subject matter may utilize any now known and/or later developed versions of these example operations, standards, specifications, and/or architectures, as has been indicated previously, for example.

In an embodiment, digital content may comprise JSON digital content. Thus, example digital content, such as comprising digital content related to automobiles, may comprise JSON digital content substantially in accordance with expression (1) below:

$$
\begin{aligned}
&\{ \\
&\qquad \text{"Make": "Dodge",} \\
&\qquad \text{"Model": "Charger",} \\
&\qquad \text{"year": 2015} \\
&\}
\end{aligned} \quad (1)
$$

Typically, of course, a key to identify separate and individual items of content, such as this, may also be employed.

To index JSON digital content, in an embodiment, a PUT request, such as may be implemented using HTTP 1.1, for example, may be made to a REST API for a URI comprising an index name, a type, or feed, name, and/or an digital content identifier. As used herein, a "PUT request" refers to a request to update digital content, for example. Thus, a PUT request, such as using an example command line tool "curl" to call an example API located at an example local host at example port 9200 so as to index example JSON digital content, described above, may be substantially in accordance with expression (2) below:

```
curl -XPUT "http://localhost:9200/automobiles/newcars/1"
{
        "Make": "Dodge",
        "Model": "Charger",                                    (2)
        "year": 2015
        "feed version": "first"
}
```

As used herein, "curl" refers to an open source command line tool for communicating digital content with URL (uniform resource locator) syntax. A version 7.45.0 of curl was released on Oct. 7, 2015 [http://curl.haxx.se]. Of course, claimed subject matter is not limited in scope in these respects. Also, although a specific version of command line tool "curl" is mentioned, embodiments in accordance with claimed subject matter may utilize any now known and/or later developed versions, and/or may employ any now know and/or later developed other command line tools, for example. Additionally, embodiments in accordance with claimed subject matter are not limited in scope to the use of command line tools, such as curl, to index digital content, for example.

However, continuing, as can be seen in the example shown above in expression (2), digital content, such as substantially in accordance with JSON digital content of expression (1), may be indexed at least in part by adding and/or updating a version parameter, in an embodiment. For example, as discussed previously with reference to the FIG. 2 example, particular versions of particular feeds having particular digital content may be identified, such as for a PUT request. Thus, in an embodiment, a PUT request may identify particular digital content of a particular index at least in part by specifying an index identifier parameter value, a feed identifier parameter value, and/or a digital content identifier parameter value, again, as was described. For the example of expression (2), a PUT request may specify an index identifier parameter value of "automobiles," a feed identifier parameter value of "newcars," and/or a digital content identifier parameter of "1," for example. In the example depicted above in expression (2), a feed version parameter value of "first" may be assigned to example JSON digital content, thereby indexing, at least in part, digital content "1" of feed "newcars" of index "automobiles," in an embodiment. Of course, indexing and/or updating operations for a real-time search engine environment may include a large number of digital content items and may also include a large number of indexes and/or feeds available via any number of digital content sources. And, of course, claimed subject matter is not limited in scope to specific implementations and/or examples provided herein, such as the above, provided merely as an example illustration.

Yet another illustrative example, provided below, includes an id field and two feed versions.

```
Feed provider: Dodge
Feed version: 1
Feed:
{
"id": "charger.dodge",
"make": "Dodge",
"model": "Charger",
"year": 2015,
"feed-version": 1
}
Feed provider: Dodge
Feed version: 2
Feed:
{
"id": "charger.dodge",
"make": "Dodge",
"model": "Charger",
"year": 2015,
"feed-version": 2
}
```

Thus, a system embodiment may atomically switch between two feeds versions, such as in this example with the same "id" value in the index at the same time by employing the "id" and "feed-version" values as a tuple that identifies selected content. In this example, feed version 1 is indexed and visible to query search requests, while feed version 2 is hidden from query search requests. Version 2 is feed and is stored and indexed, as has been discussed previously. After completion of indexing, for example, feed version 1 is hidden from query search requests instead of feed version 2. Likewise, feed version 1 may be removed from searchable content, as also previously described.

In an embodiment, an example process for executing computer instructions via at least one computing device without further human interaction in which the at least one computing device includes at least one processor and at least one memory may include fetching computer instructions from the at least one memory of the at least one computing device for execution on the at least one processor of the at least one computing device, executing the fetched computer instructions on the at least one processor of the at least one computing device, and storing in the at least one memory of the at least one computing device any results of having executed the fetched computer instructions on the at least one processor of the at least one computing device. Further, in an embodiment, computer instructions to be executed may comprise instructions for execution of a search engine, wherein executing the fetched search engine instructions further comprises a process, including atomically switching between digital content versions in a real-time search engine environment. As an example, a switch may be performed atomically between a first version of a feed and an updated version of the feed in a real-time search-engine environment, as previously discussed.

Additionally, in an embodiment, atomically switching between digital content versions may include performing query operations on the first version of the digital content, wherein the first version is stored at a digital content storage device and labeled with a first version parameter value identifying the first version of the digital content, and indexing of updated digital content may occur substantially concurrently with performing the query operations, in which indexing updated digital content includes labeling updated digital content with a second feed version parameter value identifying the updated version. Further, in an embodiment, atomically switching between digital content versions may further include determining whether indexing of updated digital content has completed. Also, in an embodiment, atomically switching between digital content versions may further include initiating query operations on the updated version at least in part after a determination that indexing of the updated digital content has completed. Additionally, atomically switching between digital content versions may further include ceasing query operations on a first version of the digital content since indexing of the updated digital content has completed, in an embodiment. Further, in an embodiment, atomically switching between digital content may further include removing the first version of digital content from an index.

Figure 4:
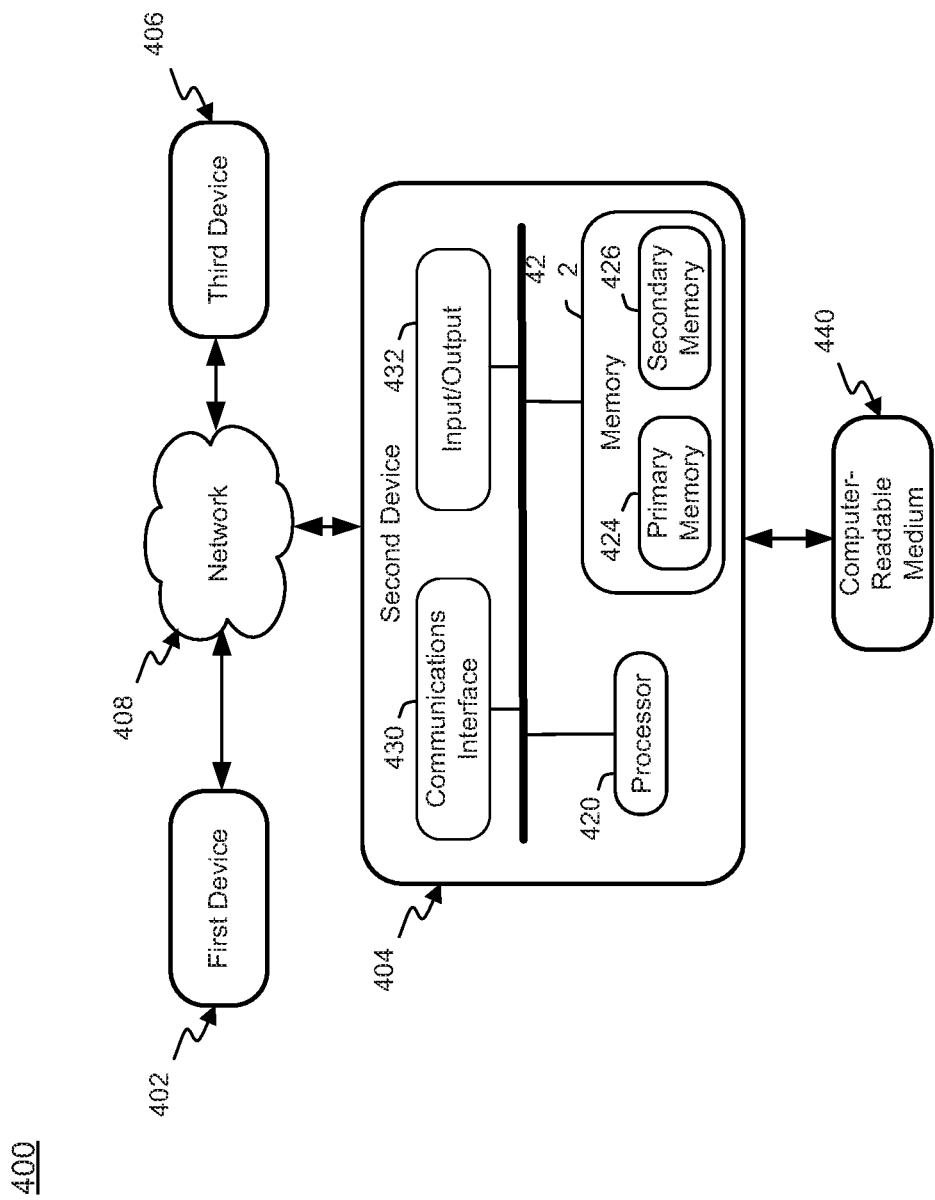
FIG. 4 is a schematic diagram illustrating an example computing device in accordance with an embodiment.

For purposes of illustration, FIG. 4 is an illustration of an embodiment of a system 400 that may be employed in a client-server type interaction, such as described infra. in connection with real-time search, such as with a network device and/or a computing device, for example. In FIG. 4, computing device 402 ('first device' in FIG. 4), which may comprise features of a client computing device, digital content source computing device, and/or server computing device, for example, may interface with computing device 404 ('second device' in FIG. 4), which may comprise features of a client computing device, digital content source computing device, and/or server computing device, for example. Communications interface 430, processor (e.g., processing device) 420, and memory 422, which may comprise primary memory 424 and secondary memory 426, may communicate by way of a communication bus, for example. In FIG. 4, computing device 402 may represent one or more sources of analog, uncompressed digital, lossless compressed digital, and/or lossy compressed digital formats for digital content of various types, such as electronic documents, video, imaging, text, audio, etc. in the form physical states and/or signals, for example. Computing device 402 may communicate with computing device 404 by way of a network, such as a network communication connection, such as an internet connection, via network 408, for example. Although computing device 404 of FIG. 4 shows the above-identified components, claimed subject matter is not limited to computing devices having only these components as other implementations may include alternative arrangements that may comprise additional components or fewer components, such as components that function differently while achieving similar results, for example. Rather, examples are provided merely as illustrations. It is not intended that claimed subject matter be limited in scope to illustrative examples.

Processor 420 may be representative of one or more circuits, such as digital circuits, to perform at least a portion of a computing procedure and/or process. By way of example, but not limitation, processor 420 may comprise one or more processors, such as controllers, microprocessors, microcontrollers, application specific integrated circuits, digital signal processors, programmable logic devices, field programmable gate arrays, and/or the like, and/or any combination thereof. In implementations, processor 420 may perform signal processing to manipulate signals and/or states, to generate signals and/or states, etc., for example.

Memory 422 may be representative of any storage mechanism. Memory 422 may comprise, for example, primary memory 424 and secondary memory 426, additional memory circuits, mechanisms, or combinations thereof may be used. Memory 422 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 422 may be utilized to store a program. Memory 422 may also comprise a memory controller for accessing computer readable-medium 440 that may carry and/or make accessible digital content, which may include code, and/or instructions, for example, executable by processor 420 and/or some other unit, such as a controller and/or processor, capable of executing instructions, for example.

Under direction of processor 420, memory, such as memory cells storing physical states, comprising, for example, a program of instructions, may be executed by processor 420 and signals generated as a result of program instruction execution may be communicated via a network, such as the Internet, for example. Device 404, as a result of program instructions being execution on processor 420, for example, may also communicate digitally-encoded signals with respect to computing device 402.

Network 408 may comprise one or more network connections, links, processes, services, applications and/or resources to support exchanging signals between a computing device, such as 402, and computing device 406 ('third device' in FIG. 4), which may, for example, comprise one or more client computing devices, digital content source computing devices, and/or server computing devices. By way of example, but not limitation, network 408 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store digital content, such as electronic documents, measurements, text, images, video, audio, etc. in the form of signals and/or states. Thus, a computing device, in this context, may comprise hardware, software, firmware, or any combination thereof (other than software per se). Computing device 404, as depicted in FIG. 4, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 422 may store cookies relating to one or more users and may also comprise a computer-readable medium that may carry and/or make accessible digital content, including code and/or instructions, for example, executable by processor 420 and/or some other device, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple devices, including client devices, with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages (e.g., content), such as via protocols suitable for transmission of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include and/or execute a software application to process and/or communicate digital content, such as, for example, textual content, digital multimedia content, and/or the like. A computing and/or network device may also include and/or execute a software application to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be substantially compliant and/or substantially compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of digital content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method, comprising:
   performing query operations on a particular version of a feed in a real-time search engine environment, wherein the particular version of the feed is stored at a digital content storage device and labeled with a first feed version identifier specifying the particular version of the feed;
   indexing, in the real-time search engine environment, a partial but not complete update of feed content associated with the feed substantially concurrently with the performing the query operations on the particular version of the feed, wherein the indexing the partial but not complete update of the feed content includes labeling the partial but not complete update of the feed content with a second feed version identifier specifying a subsequent version of the feed while non-updated feed content associated with the feed is labelled with the first feed version identifier specifying the particular version of the feed;
   after indexing the partial but not complete update of the feed content associated with the feed is completed, initiating one or more query operations on feed content corresponding to the subsequent version of the feed in the real-time search engine environment;
   filtering one or more search results based upon one or more feed version identifiers associated with the one or more search results, wherein the filtering comprises providing for display one or more first search results associated with the first feed version identifier but not one or more second search results associated with the second feed version identifier at a first time such that the one or more first search results are visible and the one or more second search results are not visible; and
   responsive to determining that the partial but not complete update of the feed content is complete after the filtering, performing a switch of visible digital content, wherein the switching comprises providing for display the one or more first search results and the one or more second search results at a second time after the first time such that the one or more first search results are visible and the one or more second search results are also visible.

2. The method of claim 1, comprising:
   indexing an update of feed content associated with a second feed in the real-time search engine environment, wherein the indexing the partial but not complete update of the feed content associated with the second feed is performed independent of indexing the partial but not complete update of the feed content associated with the feed.

3. The method of claim 1, comprising:
   determining whether the indexing the partial but not complete update of the feed content associated with the feed has completed.

4. The method of claim 3, wherein the initiating the one or more query operations on the subsequent version of the feed, is performed after a determination that the indexing of the partial but not complete update to the feed content associated with the feed has completed.

5. The method of claim 1, comprising:
   hiding the feed content labeled with a third feed version identifier specifying the particular version of the feed for at least one query operation that takes place after a determination that the indexing of the partial but not complete update to the feed content associated with the feed has completed.

6. The method of claim 1, comprising hiding the feed content labeled with a third feed version identifier specifying the subsequent version of the feed for at least one query operation that takes place before the indexing of the partial but not complete update of the feed content associated with the feed has completed.

7. The method of claim 1, comprising:
   after indexing the partial but not complete update of the feed content associated with the feed is completed, switching displayed feed content associated with the feed such that the feed content labeled with a third feed version identifier specifying the subsequent version of the feed is displayed.

8. The method of claim 7, wherein the switching the displayed feed content associated with the feed is performed for a specified set of users.

9. An apparatus comprising:
   at least one computing device;
   the at least one computing device including at least one processor and at least one memory;
   the at least one computing device configured to:
      perform query operations on a particular version of a feed in a real-time search engine environment, wherein the particular version of the feed is stored at a digital content storage device and labeled with a first feed version identifier specifying the particular version of the feed;
      index, in the real-time search engine environment, a partial but not complete update of feed content associated with the feed substantially concurrently with the performing the query operations on the particular version of the feed, wherein the indexing the partial but not complete update of the feed content includes labeling the partial but not complete update of the feed content with a second feed version identifier specifying a subsequent version of the feed;

after indexing the partial but not complete update of the feed content associated with the feed is completed, initiate one or more query operations on feed content corresponding to the subsequent version of the feed in the real-time search engine environment;

filter one or more search results based upon one or more feed version identifiers associated with the one or more search results, wherein the filtering comprises providing for display one or more first search results associated with the first feed version identifier but not one or more second search results associated with the second feed version identifier at a first time such that the one or more first search results are visible and the one or more second search results are not visible; and responsive to determining that the partial but not complete update of the feed content is complete after the filtering, performing a switch of visible digital content, wherein the switching comprises provide for display the one or more first search results and the one or more second search results at a second time after the first time such that the one or more first search results are visible and the one or more second search results are also visible.

10. The apparatus of claim 9, the at least one computing device configured to:

index an update of feed content associated with a second feed in the real-time search engine environment, wherein the indexing the partial but not complete update of the feed content associated with the second feed is performed independent of indexing the partial but not complete update of the feed content associated with the feed.

11. The apparatus of claim 9, the at least one computing device configured to:

determine whether the indexing the partial but not complete update of the feed content associated with the feed has completed;

wherein the initiating the one or more query operations on the subsequent version of the feed is performed after determining that the indexing of the partial but not complete update of the feed content associated with the feed has completed.

12. The apparatus of claim 9, the at least one computing device configured to:

hide the feed content labeled with a third feed version identifier specifying the particular version of the feed for at least one query operation that takes place after a determination that indexing the subsequent version of the feed has completed.

13. The apparatus of claim 9, the at least one computing device configured to:

hide the feed content labeled with a third feed version identifier specifying the subsequent version of the feed for at least one query operation that takes place before the indexing of the partial but not complete update of the feed content associated with the feed has completed.

14. The apparatus of claim 9, the at least one computing device configured to:

after indexing the partial but not complete update of the feed content associated with the feed is completed, switch displayed feed content associated with the feed such that the feed content labeled with a third feed version identifier specifying the subsequent version of the feed is displayed.

15. The apparatus of claim 14, wherein the switching the displayed feed content associated with the feed is performed for a specified set of users.

16. A computer program product, comprising one or more non-transitory computer readable media having computer program instructions stored therein, the computer program instructions being configured such that, when executed by one or more processors, the computer program instructions cause the one or more processors to:

perform query operations on a particular version of a feed in a real-time search engine environment, wherein the particular version of the feed is stored at a digital content storage device and labeled with a first feed version identifier specifying the particular version of the feed;

index, in the real-time search engine environment, a partial but not complete update of feed content associated with the feed substantially concurrently with the performing the query operations on the particular version of the feed, wherein the indexing the partial but not complete update of the feed content includes labeling the partial but not complete update of the feed content with a second feed version identifier specifying a subsequent version of the feed while non-updated feed content associated with the feed is labelled with the first feed version identifier specifying the particular version of the feed;

after indexing the partial but not complete update of the feed content associated with the feed is completed, initiate one or more query operations on feed content corresponding to the subsequent version of the feed in the real-time search engine environment; and responsive to determining that the partial but not complete update of the feed content is complete, perform a switch of visible digital content, wherein the switching comprises providing for display one or more first search results associated with the first feed version identifier and one or more second search results associated with the second feed version identifier such that the one or more first search results are visible and the one or more second search results are also visible.

17. The method of claim 1, wherein the second feed version identifier associated with the subsequent version of the feed indicates that the subsequent version of the feed is an update to the particular version of the feed.

18. The method of claim 1, wherein the particular version of the feed and the subsequent version of the feed each has associated therewith a corresponding feed identifier.

* * * * *